US008515961B2

(12) United States Patent
Lee et al.

(10) Patent No.: US 8,515,961 B2
(45) Date of Patent: Aug. 20, 2013

(54) METHOD AND APPARATUS FOR INDEXING SUFFIX TREE IN SOCIAL NETWORK

(75) Inventors: Jong-Hoon Lee, Daejeon (KR); Young Ho Park, Daejeon (KR); Hoo Young Ahn, Daejeon (KR); Jung Tae Kim, Daejeon (KR); Hoon Ki Lee, Daejeon (KR); Euihyun Paik, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 12/958,901

(22) Filed: Dec. 2, 2010

(65) Prior Publication Data

US 2011/0179030 A1    Jul. 21, 2011

(30) Foreign Application Priority Data

Jan. 19, 2010 (KR) .......................... 10-2010-0004780
Jul. 30, 2010 (KR) .......................... 10-2010-0073976

(51) Int. Cl.
*G06F 7/00* (2006.01)
*G06F 17/30* (2006.01)

(52) U.S. Cl.
USPC ........................................... 707/741; 707/797

(58) Field of Classification Search
USPC ................................................ 707/797, 741
See application file for complete search history.

(56) References Cited

U.S. PATENT DOCUMENTS

| 6,522,632 B1 * | 2/2003 | Waters et al. | 370/254 |
| 2010/0005087 A1 | 1/2010 | Basco et al. | |
| 2011/0191382 A1 * | 8/2011 | Ghoting et al. | 707/797 |

FOREIGN PATENT DOCUMENTS

| JP | 2009-134520 | 6/2009 |
| KR | 1020090019064 | 2/2009 |
| KR | 1020100006752 | 1/2010 |

OTHER PUBLICATIONS

Toru Kasai, Gunho Lee, Hiroki Arimura, Setsuo Arikawa and Kunsoo Park, Linear-Time Longest-Common-Prefix Computation in Suffix Arrays and Its Applications, CPM 2001, LNCS 2089, pp. 181-192, published 2001.*
Ching-Fung Cheung, Jeffrey Yu and Hongjun Lu, Constructing Suffix Tree for Gigabyte Sequences with Megabyte Memory, IEEE Transactions on Knowledge and Data Engineering, vol. 17, No. 1, Jan. 2005, p. 90-105.*
Sandeep Tata, Richard Hankins and Jignesh Patel, Practical Suffix Tree Construction, Proceedings of the 30th VLDB Conference, published 2004.*
Phoophakdee, Benjarath et al., "Genome-scale Disk-based Suffix Tree Indexing," Proceedings of ACM SIGMOD International Conference on Management of Data, pp. 833-877 (2007).

* cited by examiner

*Primary Examiner* — Jeffrey A Burke
(74) *Attorney, Agent, or Firm* — Nelson Mullins Riley & Scarborough LLP (57) ABSTRACT

A method for indexing a suffix tree in a social network includes: scanning an input string and dividing the string into partitions each having a common prefix; performing no-merge suffix tree indexing on the divided partitions; storing information on the partitions on which no-merge suffix tree indexing is performed; storing suffix nodes of the no-merge suffix tree; and establishing a prefix tree. The performing no-merge suffix tree indexing includes: generating a set of suffixes having the common prefix in the input string; generating a suffix set from the set of suffixes and storing the suffix set; and building the suffix set as a sub-tree.

17 Claims, 8 Drawing Sheets

METHOD AND APPARATUS FOR INDEXING SUFFIX TREE IN SOCIAL NETWORK

CROSS-REFERENCE(S) TO RELATED APPLICATION(S)

The present invention claims priority of Korean Patent Application Nos. 10-2010-0004780 and 10-2010-0073976, respectively filed on Jan. 19, 2010 and Jul. 30, 2010, which are incorporated herein by reference.

FIELD OF THE INVENTION

The present invention relates to a technology for suffix tree-based social network management, and more particularly, to an apparatus and method for clustering social relationship behavioral patterns based on the generation of the same patterns using a suffix tree.

BACKGROUND OF THE INVENTION

A social network refers to a social relationship structure created by the mutually depending relationships between nodes as persons and groups on the Web, in which profiles of each user are searched and new connections and information communication are supported. As the social network expands, types of services are diversified and the necessity of customized social network services providing various services depending on the characteristics of users is increasing.

That is, a group-tailored social network service of classifying individuals to group users having similar characteristics and supporting services matching with the characteristics of the groups needs to be supported. Types of the people in the social network can be recognized by analyzing patterns of behaviors repeated in the social network.

Techniques for collecting and grouping data having the repeated similar characteristics have been studied in various ways, and in particular, suffix tree indexing verified in the field of information search is one of indexing schemes for effectively grouping similar words and phrases when they are repeated.

The suffix tree indexing is an effective technique when the frequency of suffixes having a common prefix is high, for which diverse algorithms have been proposed.

However, the existing algorithms have a structure in which they are inserted into a sub-tree of a disk, so while a tree is built, frequent random access of the disk can be generated. Further, although some algorithms include a concrete buffering strategy for effectively using cache by configuring every sub-tree during accessing at the first stage, but such an access is effective only when a query is short compared to the entire sequence. Namely, when a query is long, since the entire tree needs to be allocated to a memory, the performance becomes poor. In addition, as the size of the entire sequence increases, a pre-processing cost with respect to each suffix additionally occurs, and in case of some divisions, a data skew is generated.

The data skew is a problem occurring as the generation frequency of suffixes sharing each prefix is not uniform when a string is divided with prefixes each having the same length. For example, in case of human gene, when the length of a longest common prefix (LCP) is 1, each prefix A, C, T, and G are divided by the rates of about 30%, 20%, 20%, and 30%, respectively, so some divided sub-trees may have a large size. In addition, when the LCP value is great, a many partitions are generated to cause a resource load, and when the LCP value is small, a sub-suffix tree larger than a memory is generated to generate an additional disk I/O.

Thus, in a suffix tree algorithm for solving the data skew problem, a suffix tree of a variable length scheme is generated to divide and merge partitions based on variable prefixes to thereby build a large amount of DNA sequences within a short time in a memory. However, the suffix tree algorithm has a problem in that a large memory and disk space are required in building a tree and a disk I/O is generated to merge sub-trees having the common prefix.

SUMMARY OF THE INVENTION

Therefore, the present invention provides a suffix tree indexing technique in a group-tailored social network that classifies similar users into groups, congregates different types of people, and supports a service depending on the characteristics of the congregated groups, to thereby provide a customized social network service in line with an expanded social network.

To this end, the present invention provides a suffix tree indexing method for indexing repeated user behavioral patterns by using a suffix tree to group users, and in particular, improving the problems of the existing suffix tree algorithms. That is, the present invention provides a suffix tree indexing technique in a social network for effectively clustering users in a social network based on the characteristics of user groups by effectively building a suffix tree by employing a no-merge suffix tree scheme.

In accordance with an aspect of the present invention, there is a method for indexing a suffix tree in a social network. The method includes: scanning an input string and dividing the string into partitions each having a common prefix; performing no-merge suffix tree indexing on the divided partitions; storing information regarding the no-merge suffix tree indexed on the partitions on which no-merge suffix tree indexing is performed; storing suffix nodes of the no-merge suffix tree; and establishing a prefix tree.

In accordance with another aspect of the present invention, there is an apparatus for indexing a suffix tree in a social network. The apparatus includes: a clustering unit for scanning an input string and dividing the input string into partitions, each having a common prefix, using a no-merge suffix tree indexing technique; a first storage unit for storing partition information satisfying a particular conditions of suffixes in the partitions; and a second storage unit for storing partition information not satisfying the particular conditions of suffixes in the partitions.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

An embodiment of the present invention relates to a social network service scheme indexing behavioral patterns repeated in a social network thereby effectively grouping them. That is, the embodiment of the present invention proposes a suffix tree clustering method using a suffix tree which most effectively indexes when a particular character pattern is repeated. In particular, the embodiment of the present invention proposes a space-effective no-merge suffix tree indexing scheme which uses a smaller amount of a memory by complementing the drawbacks of the conventional algorithms building a suffix tree.

In the embodiment of the present invention, the purpose of using a suffix tree as a clustering scheme for classifying user types is to index repeated behavioral patterns of individuals in a social network document set to cluster similar types of users and manage them. The behavioral patterns of users considered in an embodiment of the present invention may be one or more frequently repeated patterns, and because the order of the patterns or the like is considered as significant expression information, such information is utilized for grouping users depending on their types.

In order to achieve the above object, the scheme for a non-merge suffix tree in accordance with the embodiment of the present invention may include a configuration of establishing a variable length suffix tree, storing a suffix node, divide a non-merged partition, and processing a query.

In the embodiment of the present invention, DNA data including a repetition of limited types of prefix characters (A, C, T, and G) will be exemplified.

The suffix tree building scheme in accordance with the embodiment of the present invention is based on the following two basic features.

First, a suffix link is removed from a suffix tree. A suffix link exists in each internal node, which points to a tree node indexing a suffix having same prefix. However, when a new node identical to a prefix in the existing nodes is generated, the suffix link may cause a memory bottleneck phenomenon because the already built tree needs to be changed. Further, in the aspect that pointer information indicating a suffix needs to be stored, the suffix link is ineffective.

Second, a variable length division scheme in which the length of a prefix is flexible is employed. The variable length division scheme can solve a data skew problem. The no-merge suffix tree in accordance with the embodiment of the present invention can be made by performing a variable length prefix dividing step and a sub-suffix tree building step. Table 1 shown below defines symbols used for explaining the no-merge suffix tree in accordance with the embodiment of the present invention.

TABLE 1

| Pprefix | Set of suffixes having a common prefix |
|---|---|
| C (Pprefix) | Frequency number of generation of prefix suffixes |
| \|Pprefix\| | Length of common prefix |
| Sizeof(Input) | Size of entire data |
| Mavailable | Available amount of entire memory |
| t | Threshold value |

The variable length suffix building step is as follows.

Step 1: An input string is divided into partitions having the common prefix of |Pprefix|=1 while scanning the entire sequence. For example, the input string is divided into four partitions having a prefix consisting of A, C, G, and T.

Step 2: Every partition Pprefix is divided until Eq. 1 shown below is satisfied. Namely, when a generation frequency number C(Pprefix) of suffixes having the common prefix is less than or equal to a threshold value t, every partition is divided into partitions and stored in a disk. When the generation frequency number is greater than the threshold value t, the corresponding partition is inserted into a queue. The partition is divided by extending a prefix until every partition is not greater than the threshold value, and the divided partition is deleted from the queue.

$$C(\text{Pprefix}) \leq t \qquad \text{Eq. 1,}$$

wherein the threshold value t is calculated as a maximum value by which a required memory amount does not exceed a current available memory M when a sub-tree is constituted with suffixes. Cost for building the partition is represented by Eq. 2 shown below, in which n refers to an offset in the suffix and prefix n refers to a character string at the nth position. Max Prefix refers to the length of a maximum prefix with which the partition satisfies the generation frequency number below the threshold value.

$$O(\Sigma_{n=0}^{max\ prefix} C(P_{prefix\ n})) \qquad \text{Eq. 2}$$

In general, the number of leaf nodes in the DNA sequence is equal to the number of suffixes, and the number of internal nodes is about leaf nodes *0.75.

In the present invention, the leaf nodes and internal nodes require a memory of 12 bytes, respectively, so that the number of estimated nodes can be calculated as represented by Eq. 3 below:

$$12(C(\text{Pprefix})*1.75) + \text{Sizeof(Input)}/4 \leq \text{Mavailable} \qquad \text{Eq. 3.}$$

When the generation frequency number of suffixes is C(Pprefix) and the indexed overall data size is Sizeof(Input), the threshold value t is equal to a maximum C(Pprefix) satisfying Eq. 3. In Eq. 3, the reason for dividing the overall data size by 4 is because the entire character strings are converted into bits and then allocated to the memory.

Step 3: Every suffix with respect to partitions in which Pprefix satisfies Eq. 1 is built as a sub-tree Tsub. The size of the built sub-tree is a maximum value not exceeding Mavailable. As for a node insertion in Tsub, a path is followed until when a mismatch occurs between labels by comparing lower nodes from a root node or the node insertion is performed until when inserted suffixes are all matched. In the former case, a suffix following a finally matched offset i is inserted as a new leaf node to have a node indexing up to the $i_{th}$ label as a parent node, and a new sibling node indexing the labels of the remaining portions is generated from i. In the latter case, it is generated as a child node of the node n entirely matched to the suffix, or added as a sibiling node of the child node of n.

The respective partitions all share different prefixes. Therefore, after a certain partition is generated as a sub-tree, it does not need to be loaded to the memory again in the process of building a different partition as a sub-tree. Thus, the sub-tree generated from the partition is immediately recorded in the disk.

Step 4: In the last step, a tree Tpre for the prefixes of all the partitions is generated on the memory. When queried, the completed tree can load a sub-tree having the same prefix and process the query.

Hereinafter, embodiments of the present invention will now be described in detail with reference to the accompanying drawings which form a part hereof.

Figure 1:
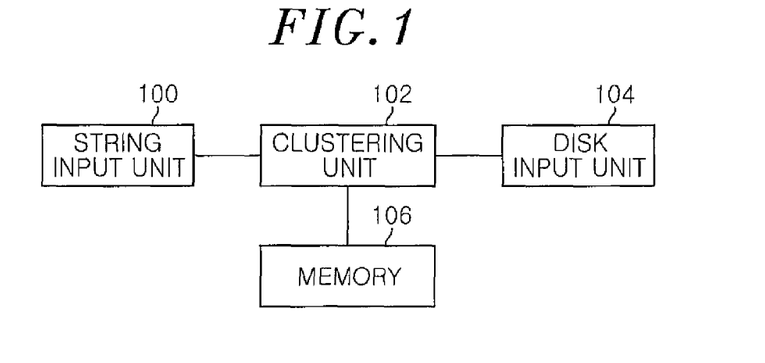
FIG. 1 shows a schematic block diagram of an apparatus for indexing a suffix tree in a social network in accordance with an embodiment of the present invention.

FIG. 1 shows a schematic block diagram of an apparatus for indexing a suffix tree in a social network in accordance with the embodiment of the present invention. The suffix tree indexing apparatus includes a string input unit 100, a clustering unit 102, a disk 104, a memory 106 and the like.

As shown in FIG. 1, the clustering unit 102 serves to scan the entire strings input through the string input unit 100 to divide the same into partitions having a common prefix, and when a condition that the frequency number of suffix generation in the divided partitions is less than or equal to a threshold value is met, the clustering unit 102 serves to store the corresponding partition information in the disk 104.

In addition, when the condition that the generation frequency number having the common prefix is less than or equal to the threshold value is not met, the clustering unit 102 stores the corresponding partition information in the memory 106.

Further, the clustering unit 102 makes suffix sets as a sub-tree by employing a no-merge suffix tree indexing scheme in the partition dividing process. Specifically, the clustering unit 102 include a string input function, a function of generating a set of suffixes having the common prefix in the input string, a suffix set generation function, a disk storage function, a memory writing function, a function of generating suffix sets as a sub-tree and the like.

The disk 104 is, e.g., a first storage unit which stores partition information satisfying the particular condition by the clustering unit 102.

The memory 106 is, e.g., a second storage unit which stores corresponding partition information when the particular condition is not satisfied.

Figure 2:
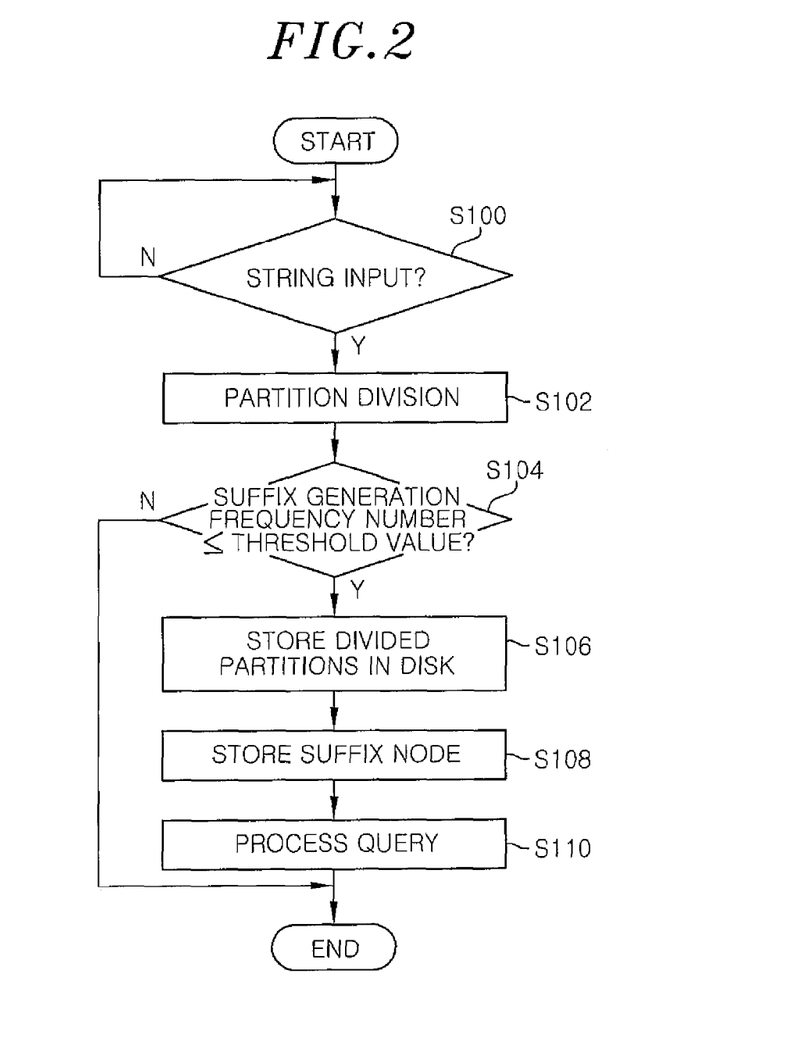
FIG. 2 is a flowchart illustrating a method for indexing a suffix tree in a social network in accordance with the embodiment of the present invention.

FIG. 2 is a flowchart illustrating a method for indexing a suffix tree in a social network in accordance with an embodiment of the present invention.

The suffix tree indexing method in accordance with the embodiment of the present invention includes a string input process, a process of a partition division with respect to an input string to generate a suffix tree, a process of storing a suffix node, a process of processing a query and the like. This will now be described in detail with reference to FIG. 2.

As shown in FIG. 2, when an entire string is input through the string input unit 100 in step S100, the clustering unit 102 scans the input string to divide it into partitions having a common prefix in step S102. Then, the clustering unit 102 determines whether or not the condition that a generation frequency number of suffixes having the common prefix is less than or greater than a threshold value is met in step S104. Here, the suffix is a set of character string, which includes, e.g., A, C, G and T or the like.

When the generation frequency number of suffixes having the common prefix is less than or equal to the threshold value, the clustering unit 102 stores the divided partition information in the disk 104 to generate the suffix set as a sub-tree (suffix tree) in step S106.

In this case, in the embodiment of the present invention, a no-merge suffix tree indexing scheme is employed in the partition division and storing process. More specifically, the no-merge suffix tree indexing process includes a string input process, a process of generating a set of suffixes having the common prefix in the input string, a process of generating a suffix set, a disk storing process, a process of generating a suffix set as a sub-tree and the like.

Meanwhile, when the condition that the generation frequency number of suffixes having the common prefix is less than or equal to the threshold value are not met, the clustering unit 102 stores the divided partition information in the memory 106.

Thereafter, the clustering unit 102 performs a suffix node storing process in step S108, in which the suffix node storing process features that the suffix nodes are stored without suffix links in accordance with the present embodiment.

Finally, the clustering unit 102 performs query processing including a prefix tree building process in step S110 and then completes the suffix tree indexing process in accordance with the embodiment of the present invention.

Hereinafter, the process shown in FIG. 2 will be described in more detail.

Figure 3:
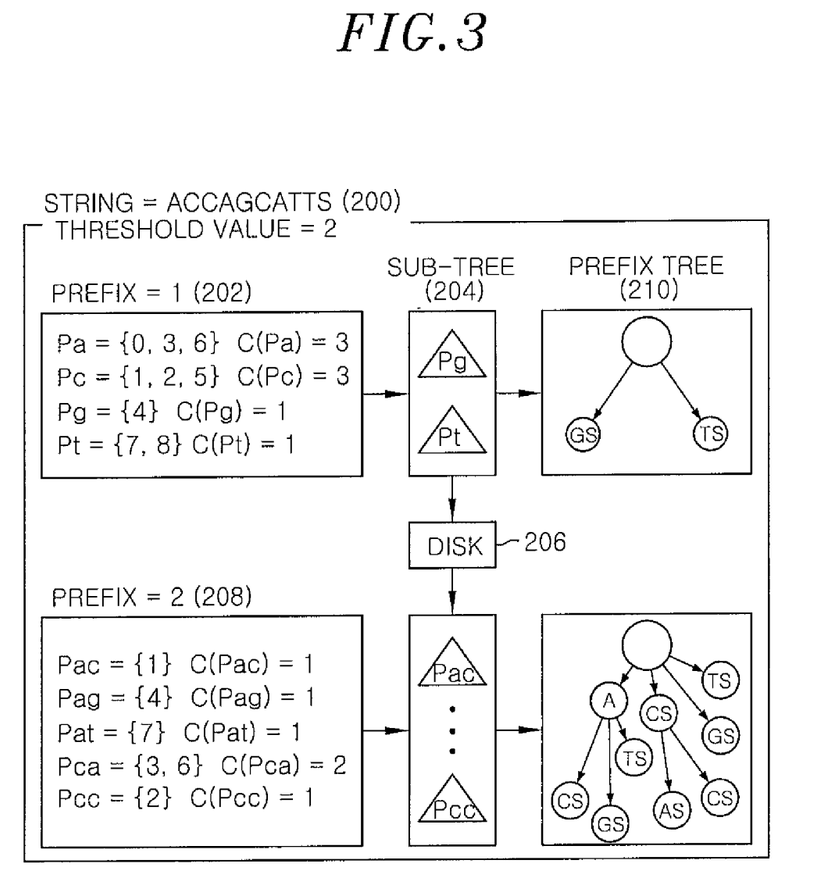
FIG. 3 illustrates a process of a partition division when a string is input and generating a suffix tree in accordance with the embodiment of the present invention.

FIG. 3 illustrates the process of dividing a partition when a string is input to generate a suffix tree, specifically, step S102 to step S106 shown in FIG. 2, in accordance with an embodiment of the present invention.

FIG. 3 shows an example of building a suffix tree when S=ACCAGCATT 200 and the threshold value t=2.

In a first step 202, a set of prefixes P={Pprefix ... } is configured with respect to the entire sequence. The length of the prefix of the set P is $0 \leq |prefix| < |S|$, and S (input string) is entirely scanned to obtain partitions Pa, Pc, Pg, Pt that |prefix|=1. Here, Pa refers to a partition, which is a set of suffixes having a character a as a prefix. A suffix offset in the partition Pa is {0, 3, 6} and a corresponding character string set is {ACCAGCATT$, AGCATT$, ATT$}. In case of the partition Pc, a suffix offset is {1, 2, 5} and a corresponding character string is {CCAGCATT$, CAGCATT$, CATT$}. When |prefix|=1, the generation frequency number of suffixes is calculated as C(Pa)=3, C(Pc)=3, C(Pg)=1 and C(Pt)=2, and therefore, the partitions Pg and Pt satisfying C(Pprefix)$\leq$2 are stored as a sub-tree 204 in the disk 206 and the remainder thereof may be stored in the memory.

In a second step 208, an offset of each suffix is increased to divide partitions that C(Pprefix)>2. A first offset of the suffix excluding the common prefix in Pa is {1, 4, 7} and a character is {C, G, T}. An offset in Pc is {2, 3, 6} and a character is {C, A, A}. The partitions Pac, Pag, Pat, Pca, Pcc are generated as the length of each prefix is increased, and because all the partitions satisfy that C(Pprefix)$\leq$2, they are stored as a sub-tree 204 in the disk 206.

The process of generating a prefix tree, a third step 210, will be described in detail in a query processing method shown in FIG. 6.

Figure 4:
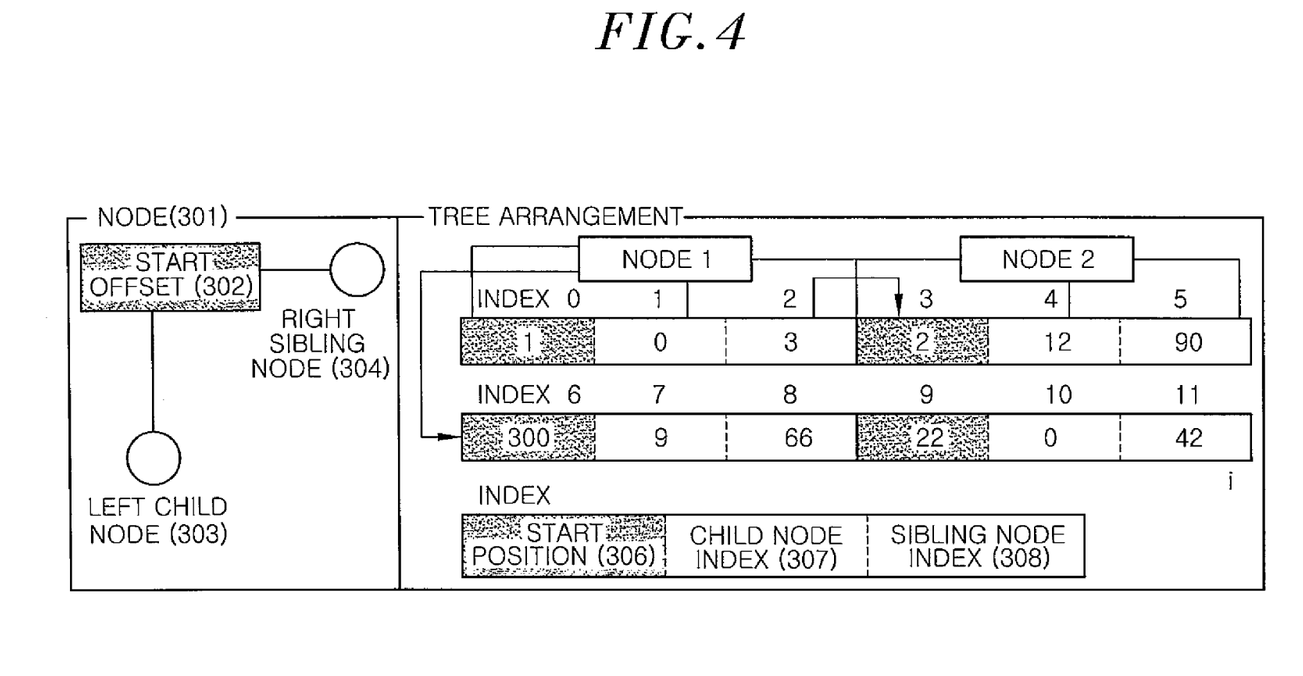
FIG. 4 illustrates a process of storing a suffix node in accordance with the embodiment of the present invention.

FIG. 4 illustrates the process of storing a suffix node, specifically, step S108 in FIG. 2, in accordance with an embodiment of the present invention. That is, FIG. 4 illustrates the process of storing a tree node of the no-merge suffix tree in accordance with an embodiment of the present invention.

In the conventional suffix tree establishing algorithm, information of every child node is stored. Thus, in case of an internal node, a storage space of 40 bytes is required, and in case of a leaf node, a storage space of 16 bytes is required. Thus, a great amount of storage space is required for nodes. In accordance with the embodiment of the present invention, a node structure without a suffix link is used, thereby enabling efficient memory use.

As shown on left in FIG. 4, every node 301 includes information regarding a start offset 302 of a character string, a pointer 303 with respect to a left child node, and pointer 304 with respect to a right sibling node, and a required memory amount per node is 12 bytes.

A right portion in FIG. 4 shows a structure of a tree arrangement 305 storing up to $i_{th}$ tree. The shaded entries refer to a start position 306 in a character string, and the remaining two entries indicate index positions of a sibling node 307 and a child node 308. The index positions are required to indicate the index of the same position when the sub-tree is stored in the disk and then allocated again to the memory. In case of a first node, a root node, it has 3 as a position of a child node, a value of a second index, so it indicates a third index, and because a first index value, i.e., a value of a sibling node, does not have a sibling node, 0 is stored.

Such a storing method can reduce the required memory amount by 4 bytes in case of the leaf node and 28 bytes in case of the internal node, compared with the conventional algorithm.

Figure 5:
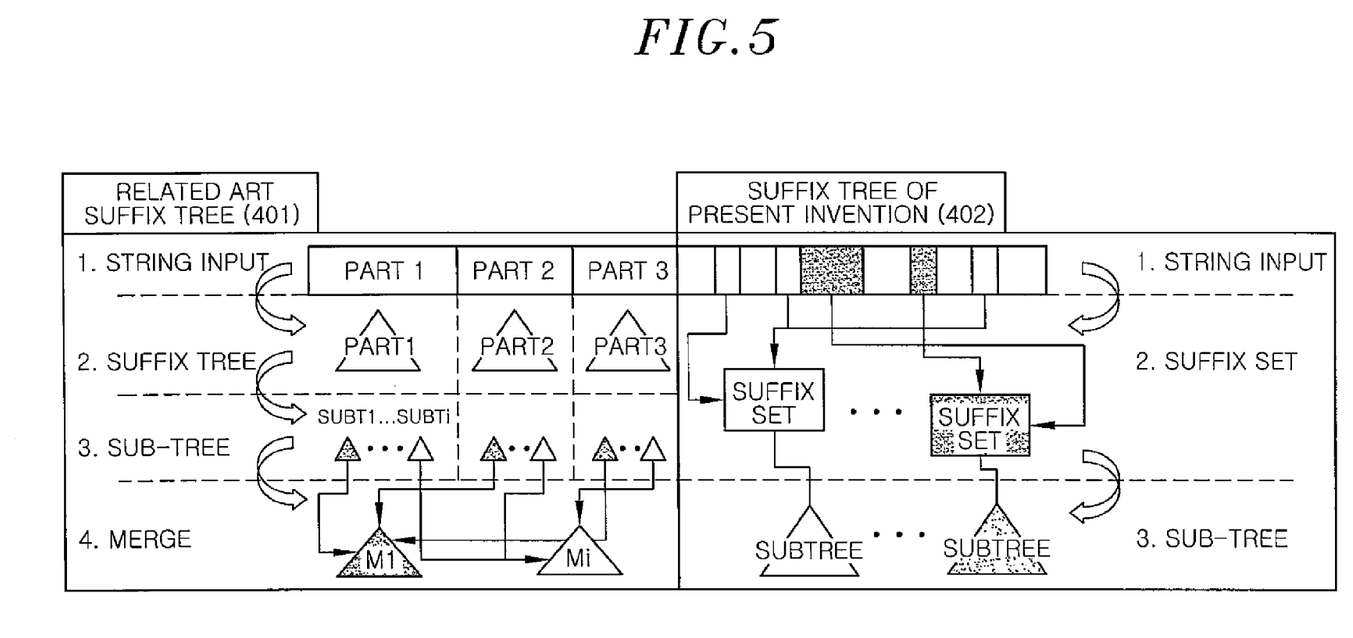
FIG. 5 shows a comparison between a conventional technique of a partition division with respect to a suffix tree and a novel technique of a partition division with respect to a suffix tree.

FIG. 5 shows the comparison between the conventional technique of a partition division with respect to a suffix tree and a novel technique of a partition division with respect to a suffix tree.

Most suffix tree building algorithms have problems in that they require a large memory due to a space load and are difficult to manage a buffer because of a low locality of reference. Thus, in order to solve these problems, a disk-based dividing scheme is employed in many studies. In FIG. 5, rectangles refer to a character string set, triangles refer to a suffix tree, and numbers indicate each step.

In FIG. 5, reference numeral 401 describes a conventional partition division scheme with respect to a suffix tree. In a first step, partitions part1, part2, part3 are generated by sequentially dividing the entire sequence. In a second step, part1, part2, part3 are built as a suffix tree and then stored in the disk. In a third step, the suffix tree established in the second step is divided into sub-trees SubT1, SubT2, SubT3 having the common prefix. In a final step, the sub-trees having the common prefix are merged in order to build the sub-trees as a complete suffix tree. Shaded triangles at left side in FIG. 5 indicate sub-trees having the common prefix, which are merged into Mi.

In the conventional algorithm, merging is performed as follows. In a first step, it is assumed that SubTi is an $i_{th}$ sub-tree and Mi is a tree obtained by merging up to SubTi, in a next step, an (i+1)th SubTi+1 is loaded to the memory and merged to obtain Mi+1. When all the sub-suffix trees are merged, they are stored in the disk again.

In the embodiment of the present invention indicated by a reference numeral 402, in order to remove the merging process, a set of suffixes having the common prefix in the entire string is generated in a first step. The shaded parts at right side in FIG. 5 indicate parts having the common prefix, which are added to a suffix set and then stored in the disk. In a second step, the respective suffix sets are built as a sub tree which is a suffix tree.

In the conventional merging process, whenever a completed tree is built with sub-trees sharing the prefix, the worst cost incurs. Also, in order to obtain prefix of each sub-tree, a disk random access with respect to a DNA sequence is generated.

In the embodiment of the present invention, partitions having a value less than or equal to the threshold value in the entire string are generated as sub-trees, rather than separating the entire string into sub-partitions having a value less than or equal to the threshold value. This method is advantageous in that because each partition has an independent prefix, there is no need to perform a complicated merging process on the partitions.

Figure 6:
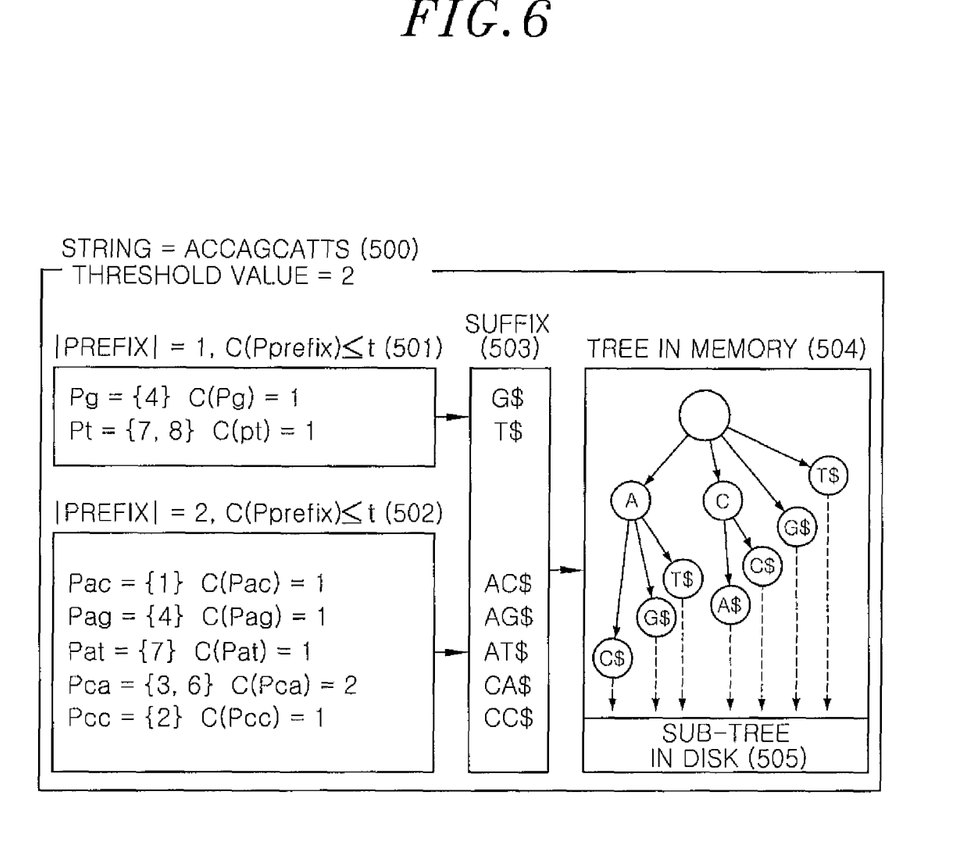
FIG. 6 illustrates processing a query by building a prefix tree 210 shown in FIG. 3 in accordance with the embodiment of the present invention.
Figure 7A:
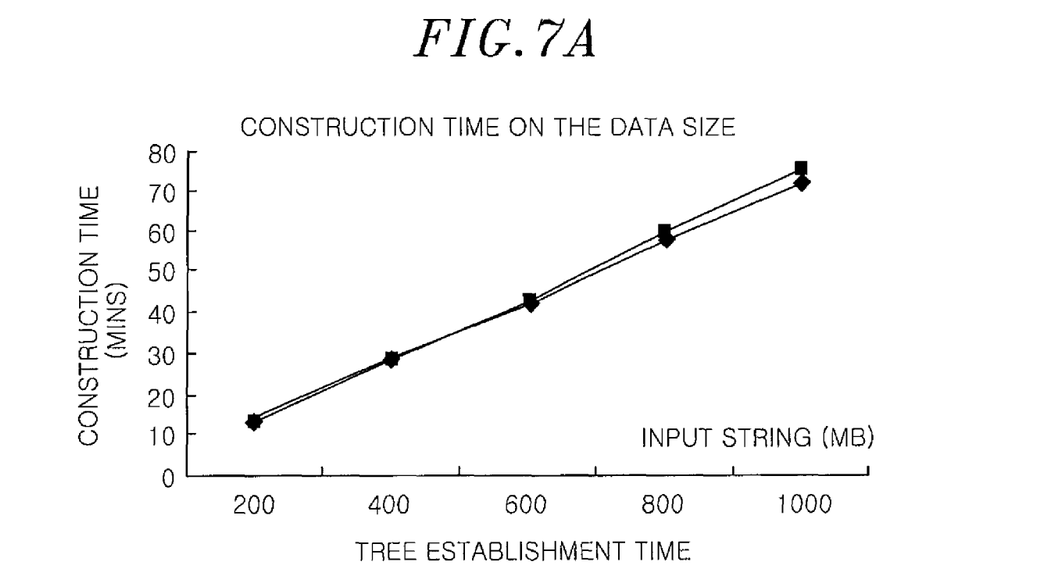
FIGS. 7A to 7F show graphs evaluating each performance (a tree generation time, a disk I/O time, the number of partitions, a required amount of memory, a query processing time and the like) depending on an increase in the size of query data.
Figure 7B:
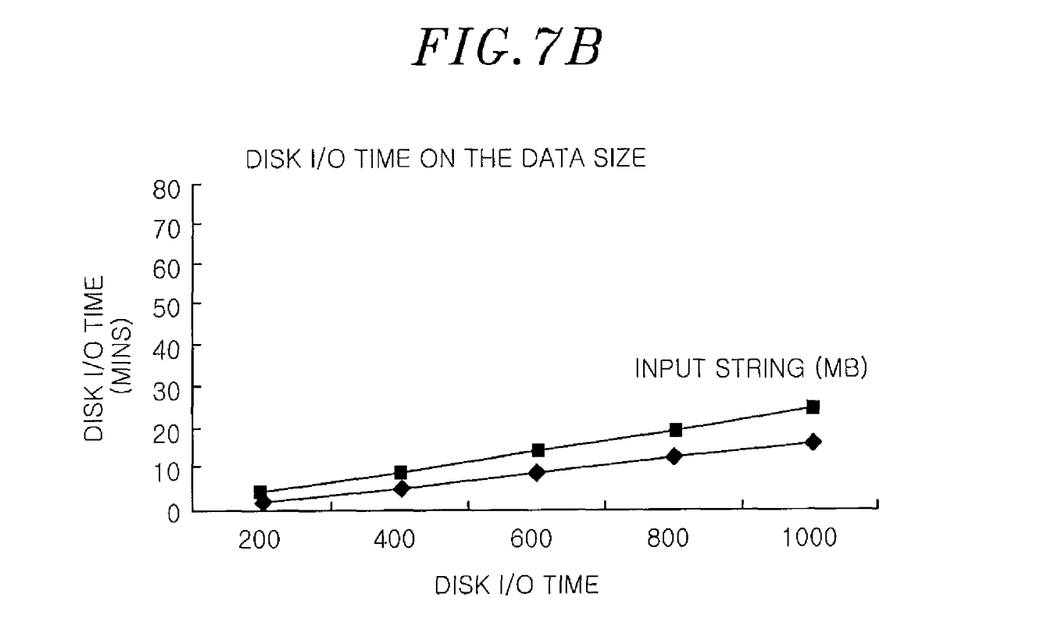
Figure 7C:
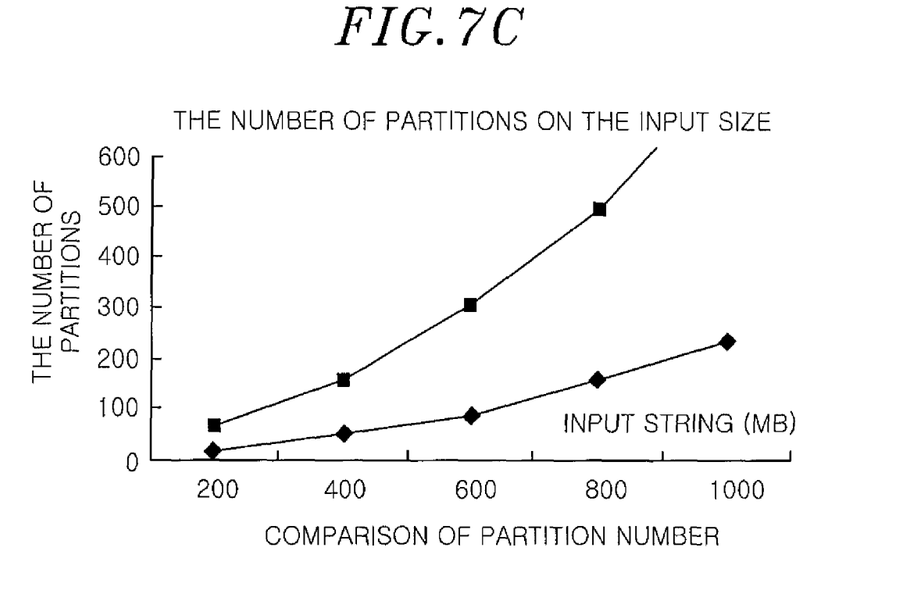
Figure 7D:
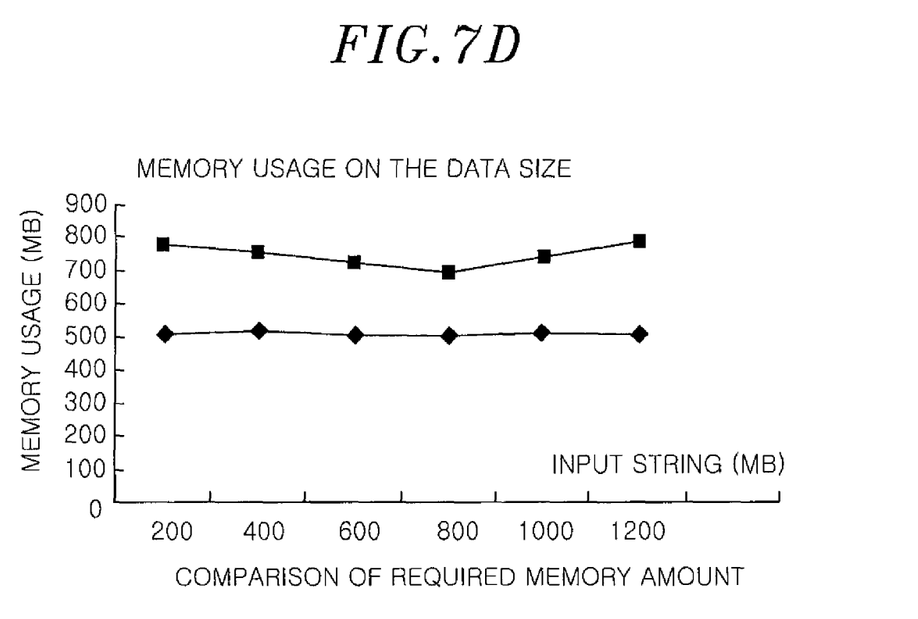
Figure 7E:
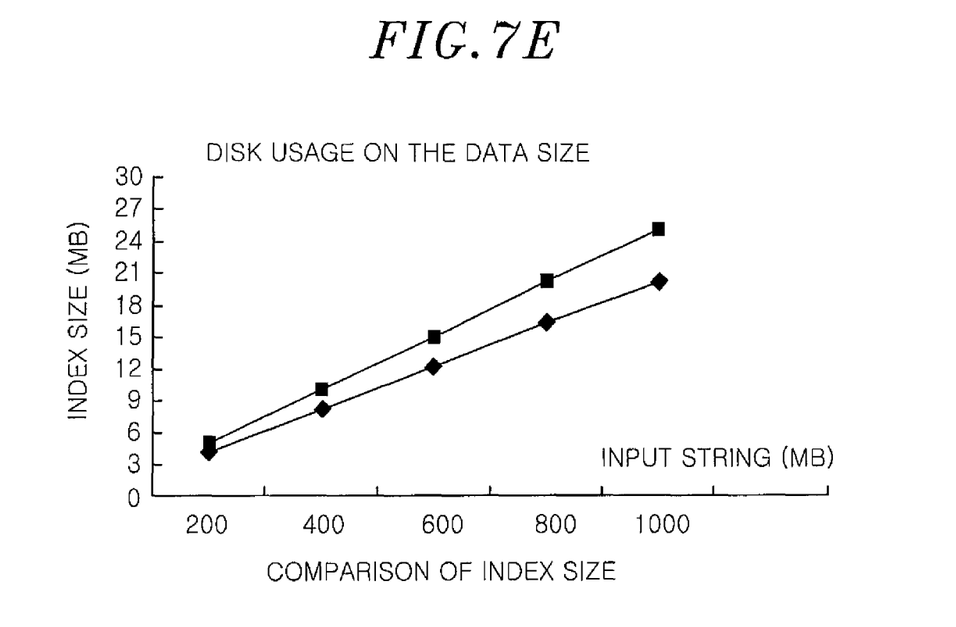
Figure 7F:
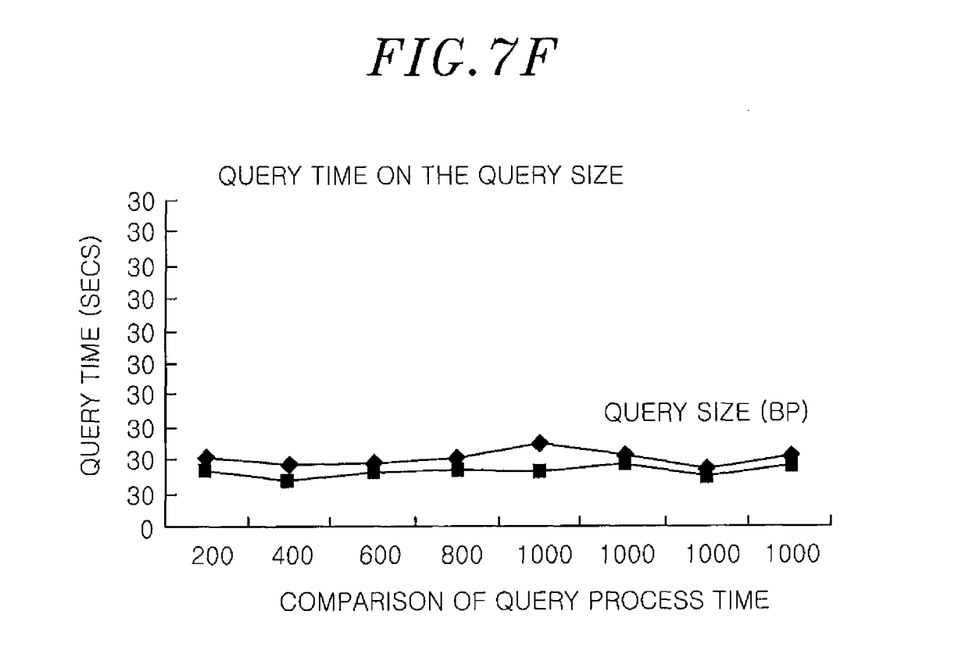

FIG. 6 illustrates the process of processing a query by building a prefix tree 210 in FIG. 3, specifically, explains step S110 in FIG. 2 by example in accordance with the embodiment of the present invention.

FIG. 6 shows the process of building a prefix tree when the entire string S=ACCAGCATT 500. The partition dividing process and suffix tree building step are same as shown in FIG. 3, which corresponds to 501 and 502 in FIG. 6. Partitions in which the generation frequency number of suffixes does not exceed 2 are {Pg, Pt, Pac, Pag, Pat, Pca, Pcc}, and prefixes of the corresponding partitions are Prefix={G$, T$, AC$, AG$, AT$, CA$, CC$} 403. The prefix of each partition becomes a suffix 504 of a prefix tree shown at the right portion of FIG. 6, and is built as a tree. Dotted arrows in the tree indicate a sub-tree 505 in which each leaf node has labels from a root to the leaf node as prefixes.

FIGS. 7A to 7F show graphs evaluating each performance (tree building time, a disk I/O time, the number of partitions, a required amount of memory, the size of index, a query processing time or the like) depending on an increase in the size of query data.

Query data was randomly extracted from experimental data and experimented, while being increased at a log scale. Each graph shows the outcomes obtained by averaging repeated experimentation results hundred times. A query processing time refers to a total time taken for searching a sub-sequence satisfying a query and returning a matching offset. Through the experimental results, the query processing rate of the conventional algorithm may be slightly faster than the query processing rate of the indexing method in accordance with the embodiment of the present invention. The reason is because, in processing a query, the conventional algorithm calculates the length of a node with the label start position and final position stored as index information, while, in the embodiment of the present invention, a child node is accessed to calculate the length of a node.

However, the speed difference between the conventional algorithm and the indexing method in accordance with the embodiment of the present invention is about an average 0.0066 seconds, which is a very slight difference, and it should be noted that the query can be processed within 0.05 seconds regardless of the size of the query data.

As described above, the present embodiment provides the suffix tree building method for indexing repeated user behavioral patterns by using a suffix tree to congregate users, and in particular, improving the problems of the existing suffix tree algorithms. That is, the present embodiment implements the suffix tree indexing technique in a social network capable of effectively clustering users in a social network based on the characteristics of user groups by effectively building a suffix tree by employing a no-merge suffix tree scheme.

The present invention proposes the no-merge suffix tree, which is a disk-based suffix tree indexing scheme, in order to effectively cluster users in a social network. The proposed suffix tree is a space-effective indexing scheme that can solve the data skew by using the variable length prefix scheme and eliminates a complicated merging process by establishing the entire structure as a tree. In generating an index, a common prefix is searched while scanning the entire sequence, and when the generation frequency number of suffixes having the common prefix is greater than a threshold value, the prefix is extended to perform partitioning. When the generation frequency number of suffixes is not greater than the threshold value, the respective suffixes of the corresponding partitions are established as a sub-tree and then stored in the disk. And then, a tree having prefixes of the partitions established as the sub-tree as suffixes is established in the memory.

According to the experimentation results verifying the excellence of the proposed method, the no-merge suffix tree can allow indexing a DNA sequence of 1 G within 71 minutes in a memory of 2 GB with an about 35% smaller memory allocation amount compared with the existing trellis algorithm and has an about 20% smaller index size compared with the existing trellis algorithm. Also, even when a query is long, the no-merge suffix tree allows for effective searching within 0.05 seconds.

The present invention is expected to be utilized for implementation of effectively congregating numerous users in the social network at a fast speed by using the no-merge disk-based suffix tree indexing technique.

While the invention has been shown and described with respect to the particular embodiments, it will be understood by those skilled in the art that various changes and modification may be made without departing from the scope of the invention as defined in the following claims.

What is claimed is:

1. A method for indexing a suffix tree in a social network, the method comprising:
    scanning, by a computing device, an input string and dividing the string into partitions each having a common prefix;
    performing no-merge suffix tree indexing on the divided partitions, wherein a suffix tree is built without performing a process of merging sub-trees having a common prefix in the no-merge suffix tree indexing;
    storing information on the partitions on which no-merge suffix tree indexing is performed;
    storing suffix nodes of the no-merge suffix tree; and
    establishing a prefix tree.

2. The method of claim 1, wherein said performing no-merge suffix tree indexing includes:
    generating a set of suffixes having the common prefix in the input string;
    generating a suffix set from the set of suffixes and storing the suffix set; and
    building the suffix set as a sub-tree.

3. The method of claim 1, wherein when a condition that a generation frequency number of suffixes in the divided partitions is less than or equal to a threshold value is satisfied, said storing information on partitions includes storing the information regarding the partitions in a first storage unit.

4. The method of claim 3, wherein the first storage unit is a disk.

5. The method of claim 1, wherein when a condition that a generation frequency number of suffixes in the divided partitions is greater than a threshold value is satisfied, said storing information on the partitions includes storing the information regarding the partitions in a second storage unit.

6. The method of claim 5, wherein the second storage unit is a memory.

7. The method of claim 1, wherein said storing suffix nodes uses a storage scheme without a suffix link.

8. The method of claim 1, wherein said building a prefix tree includes processing a user query through the social network.

9. An apparatus for indexing a suffix tree in a social network comprising:
    a processor configured to execute a clustering unit for scanning an input string and dividing the input string into partitions, each having a common prefix, using a no-merge suffix tree indexing technique, wherein a suffix tree is built without performing a process of merging sub-trees having a common prefix in the no-merge suffix tree indexing technique;
    a first storage unit for storing partition information satisfying a particular condition of suffixes in the partitions; and
    a second storage unit for storing partition information not satisfying the particular conditions of suffixes in the partitions.

10. The apparatus of claim 9, wherein when the condition that a generation frequency number of the suffixes in the partitions is less than or equal to a threshold value is satisfied, the clustering unit stores the partition information in the first storage unit.

11. The apparatus of claim 9, wherein when the condition that a generation frequency number of the suffixes in the partitions is less than equal to a threshold value is not met, the clustering unit stores the partition information in the second storage unit.

12. The apparatus of claim 9, wherein the clustering unit makes a suffix set as a sub-tree by employing the no-merge suffix tree indexing technique.

13. The apparatus of claim 12, wherein the clustering unit generates the set of suffixes having the common prefix in the string.

14. The apparatus of claim 13, wherein after the clustering unit generates the suffix set, the clustering unit stores the suffix set in the first storage unit and the second storage unit.

15. The apparatus of claim 14, wherein the clustering unit establishes the suffix set as a sub-tree.

16. The apparatus of claim 9, wherein the first storage unit is a disk.

17. The apparatus of claim 9, wherein the second storage unit is a memory.

* * * * *